3,019,379
ACCELERATING AND DECELERATING
CONTROL SYSTEM
Steve A. Zarleng, Akron, Ohio, assignor to The Clark Controller Company, Cleveland, Ohio, a corporation of Ohio
Filed July 11, 1960, Ser. No. 41,828
17 Claims. (Cl. 318—158)

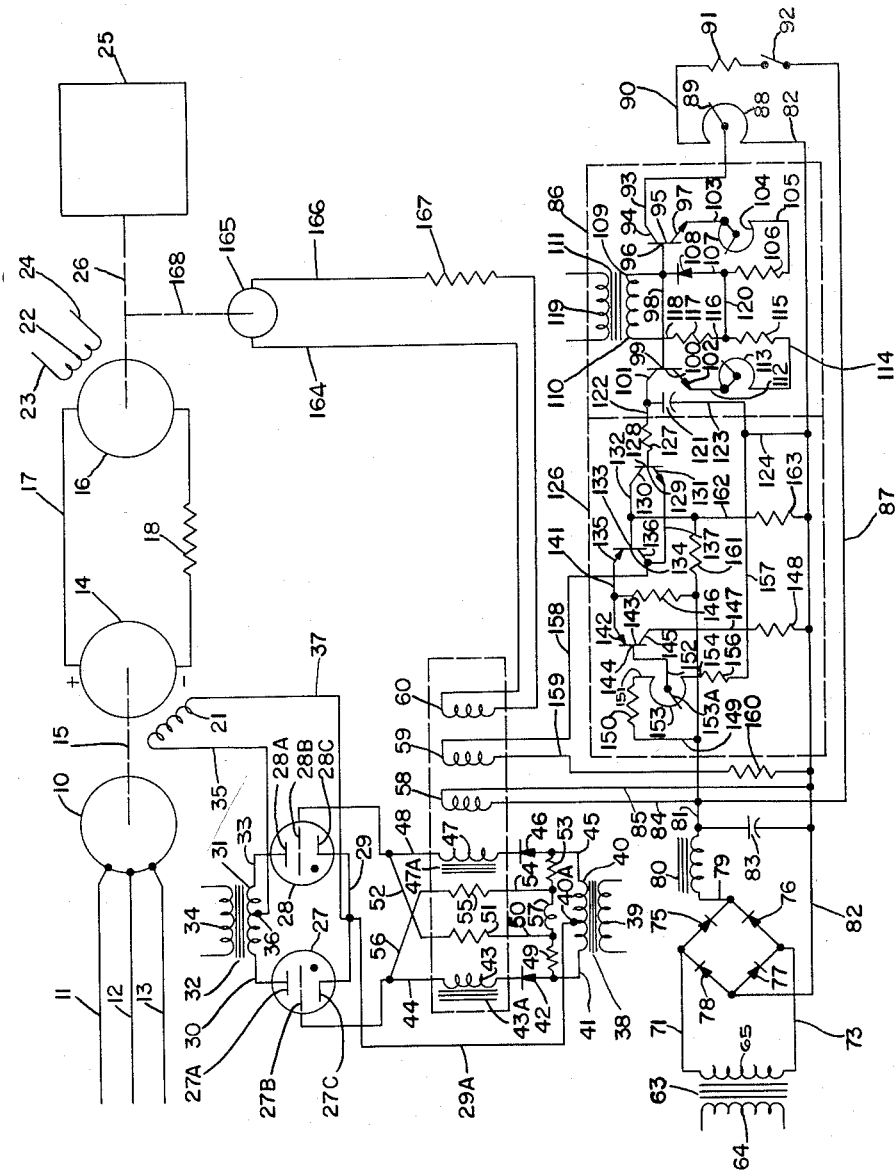

This invention relates generally to motor control systems and more particularly to systems for controlling acceleration and deceleration of a motor.

An object of this invention is to provide a motor control system whereby acceleration or deceleration of the motor is accomplished at a linear time rate and in a stepless manner.

Another object of my invention is to provide a motor control system where the acceleration of the motor may be different from its deceleration.

Still another object of my invention is to provide a motor control system whereby the acceleration and deceleration may be changed independently of each other.

A further object of my invention is to provide a motor control system whereby the speed of the motor may be changed and the motor is automatically accelerated or decelerated to the new speed.

A still further object of my invention is to provide one transistor timing circuit for controlling both the acceleration and deceleration.

Another object of my invention is to provide a transistor timing circuit which does not necessitate or require the operation of electrical contacts to transfer the operation of the circuit from acceleration to deceleration or vice versa.

Still another object of my invention is to provide a transistor signal amplifier circuit for amplifying the signal from the timing circuit so it may be utilized to control the acceleration and deceleration.

The present invention is directed toward a motor control system utilizing a power converter having a controllable output for controlling the speed of a motor. The output of the power converter is controlled by a signal which is representative of the desired motor speed.

To obtain the desired signal, a reference voltage is applied to the input terminals of a transistor timing circuit. The timing circuit consists of a condenser which is charged by the reference voltage. The rate at which the condenser is charged determines the time rate of acceleration and is controlled by the conductivity of a transistor. Conversely, the time rate of deceleration is obtained by the discharging of the condenser to the reference voltage and is controlled by the conductivity of a second transistor. The conductivity of the two transistors is independently controlled so the time rate of acceleration may be different than the time rate of deceleration.

The output of the timing circuit is connected through a signal amplifier to the control means of a power converter. Thereby, the power converter is controlled and it operates to cause the motor to accelerate or decelerate and control the time rate.

Further objects and features of the invention will be readily apparent to those skilled in the art from the following specification, taken together with the single figure drawing which illustrates a preferred embodiment thereof.

With reference to the drawing, there is shown at 10 an A.C. motor connected to be energized through A.C. supply lines 11, 12 and 13. Motor 10 is connected to drive a D.C. generator 14 at a constant speed by a drive shaft 15 indicated by the dotted line.

The output of generator 14 is connected to one terminal of a D.C. motor 16 by a wire 17 and to the other terminal by a wire 18.

Generator 14 has a field winding 21 which is variably energized to vary the output of generator 14 and thereby control the speed of motor 16.

Motor 16 has a field winding 22 which is connected by wires 23 and 24 to a suitable source of constant D.C. voltage.

Motor 16 is connected to drive a mill 25 or other type of mechanical device by a drive shaft 26 indicated by the dotted line.

The power converting system comprises a power source for variably energizing field winding 21. The power source consists of two gas filled tubes 27 and 28, such as thyratrons, which are fired repetitively in alternating half cycles. Tube 27 has an anode 27A, a control grid 27B and a cathode 27C. Tube 28 has an anode 28A, a control grid 28B and a cathode 28C. Cathodes 27C and 28C are connected together by a wire 29. Anodes 27A and 28A are connected together by a wire 30, a secondary winding 31 of a transformer 32 and a wire 33. Transformer 32 has a primary winding 34 which is connected to a suitable source of alternating current.

Field winding 21 has one side connected by a wire 35 to a center tap 36 on secondary winding 31. The other side of field winding 21 is connected by a wire 37 to wire 29.

Therefore, in the half cycle when tube 27 is conducting, current flows from secondary winding 31 through wire 30, tube 27, wire 29 and wire 37 to field winding 21 and back through wire 35 to center tap 36 on secondary winding 31.

In the other half cycle when tube 28 is conducting, current flows from secondary winding 31 through wire 33, tube 28, wire 29 and wire 37 to field winding 21 and back through wire 35 to center tap 36 on secondary winding 31.

The amount of current flowing through this path will be dependent upon the time during the respective half cycles that tubes 27 and 28 are made conductive. The method chosen for controlling the conductivity of the tubes during their respective conducting half cycle is by switching the polarity of the voltage on its control grid from a negative to a positive; and which is the subject matter of my co-pending patent application bearing Serial Number 803,189, filed on May 31, 1959, and having the same assignee as the instant invention.

The polarity switching circuit consists of a transformer 38 having a primary winding 39 connected to a suitable source of alternating current power and a secondary winding 40. Secondary winding 40 has one side connected by a wire 41, a rectifier 42, a reactor winding 43 and a wire 44 to control grid 27B of tube 27. Rectifier 42 is connected so current can flow through this circuit only during the half cycle the side of secondary winding 40 connected to wire 41 is positive with respect to the opposite side.

Reactor winding 43 is wound on a reactor core 43A.

The other side of secondary winding 40 is connected by a wire 45, a rectifier 46, a reactor winding 47 and a wire 48 to control grid 28B of tube 28. Rectifier 46 is connected so current can flow through this circuit only during the half cycle the side of secondary winding 40 connected to wire 45 is positive with respect to the side connected to wire 41.

Reactor winding 47 is wound on a reactor core 47A.

Wire 41 is connected by a resistor 49, a wire 50, a resistor 51 and a wire 52 to wire 48 to provide a current flow path from wire 48 to the side of secondary winding 40 that is connected to wire 41.

Wire 45 is connected by a resistor 53, a wire 54, a resistor 55 and a wire 56 to wire 44 to provide a current flow path from wire 44 to the side of secondary winding 40 that is connected to wire 45.

Wires 50 and 54 are connected together by a reactor 57.

A wire 29A connects wire 29 to a center tap 40A on secondary winding 40.

Control windings 58, 59 and 60 are wound on both reactor cores 43A and 47A. The purpose of these control windings and the connections thereto will be described in more detail hereinafter.

Control winding 58 is a bias winding and when energized, it produces a flux in reactor cores 43A and 47A opposite to that produced by current flowing through reactor windings 43 and 47. Control winding 58 is connected to be energized from a regulated D.C. control power supply which consists of a voltage regulating transformer 63 having a primary winding 64 and a secondary winding 65.

In one half cycle, current flows from one side of secondary winding 65 through a wire 71, a rectifier 75, a wire 79, a reactor 80, a wire 81, a wire 84 to control winding 58 and back through a wire 85, a wire 82, a rectifier 77 and a wire 73 to the second side of secondary winding 65.

In the other half cycle, current flows from the second side of secondary winding 65 through wire 73, a rectifier 76, wire 79, reactor 80, wire 81 and wire 84 to control winding 58 and back through wire 85, wire 82, a rectifier 78 and wire 71 to the first side of secondary winding 65.

A condenser 83 is connected across wires 81 and 82 to form one leg of an LC filter circuit. This filter circuit filters out the peaks or ripples appearing in the direct current output of the full wave rectifier.

The time rate of acceleration or deceleration of motor 16 is controlled by having a timing unit control the energization of control winding 59. The timing unit controls the rate at which current flow increases or decreases through control winding 59. Control winding 59 is wound on reactor cores 43A and 47A so that current flowing therethrough will produce a flux in the cores in the same direction as current flowing through reactor windings 43 and 47.

The timing unit is generally shown at 86 and because its output is of a small value, a signal amplifier must be disposed between it and control winding 59 so control winding 59 is energized with current of the proper value.

The time interval is determined by the amount of time required for a condenser to become charged to a reference voltage, or to become discharged to a reference potential.

The reference potential or voltage is obtained from the regulated D.C. power supply by a wire 87 connected to wire 81. Wire 87 is connected through a switch 92, a resistor 91, a wire 90 and a potentiometer 88 to wire 82. The reference voltage is obtained from a slider 89 of potentiometer 88 and its value depends upon the position of slider 89.

With the circuit connected as shown and upon closing switch 92, a voltage is impressed across potentiometer 88. Charging current will flow from slider 89, through a wire 93, a collector 94 of a transistor 95, a base 96 of transistor 95, a wire 98, a base 99 of a transistor 100, a collector 101 of transistor 100 and a wire 122 to charge a condenser 121. The charging current flows through condenser 121 and a wire 123, a wire 124 to wire 82. The time required for condenser 121 to become charged is dependent upon the value of the charging current and this value determines the time rate of acceleration. The value of the charging current is controlled by transistor 95.

As before mentioned, the time rate of deceleration is determined by the time required for condenser 121 to become discharged to the reference voltage.

When the setting of slider 89 is changed to decrease its voltage, condenser 121 is discharged in the reverse direction of the aforedescribed charging current path back to the reference voltage. This discharging current flows through wire 122, collector-base 101—99 of transistor 100, wire 98, base-collector 96—94 of transistor 95, wire 93 to slider 89, potentiometer 88 and wires 82, 124 and 123 to condenser 121. The time required for condenser 121 to become discharged is dependent upon the value of the discharging current and determines the time rate of deceleration. Transistor 100 controls the value of the discharging current.

It is to be noted that transistors 95 and 100 have a common base connection; that is, base 96 is connected to base 99 by wire 98. This gives these transistors stability with respect to temperature variations and transistor parameter variations, thus, eliminating the necessity of auxiliary temperature compensating circuits and the like.

To control the conductivity of transistors 95 and 100 a transformer 111 is connected to a suitable source of alternating current. If the minor variations due to line voltage changes cannot be tolerated, transformer 111 can be eliminated and the source of alternating current obtained from secondary winding 65 of the regulated transformer 63 by connection to wires 71 and 73.

Transformer 111 has a primary winding 119 and a secondary winding 110. Secondary winding 110 has one side connected by a wire 109 to wire 98.

In the half cycle wire 109 is positive, current will flow through the base-emitter circuit 96—97 of transistor 95, a wire 103, a potentiometer 104, a wire 105, a resistor 106, a wire 120, a wire 116, a resistor 117 and a wire 118 to the other side of secondary winding 110. During the same half cycle, current will also flow through wire 109, wire 98, the base-emitter circuit 99—102 of transistor 100, a wire 112, a potentiometer 113, a wire 114, a resistor 115, wire 116, resistor 117, and wire 118 to the other side of secondary winding 110.

In the other half cycle, the side of secondary winding 110 connected to wire 118 will be positive and current will flow from it through wire 118, resistor 117, wire 116, wire 120, a wire 107, a rectifier 108, and wire 109 to the first side of secondary winding 110.

In this half cycle, a negative potential is impressed upon the base of both transistors to make them non-conductive. This negative potential across the base-emitter circuit of both transistors is determined by the forward voltage drop of rectifier 108.

As before stated, transistor 95 controls the value of charging current and transistor 100 controls the value of discharging current.

It is to be noted that the setting of potentiometer 104 controls the value of current allowed to flow in base-emitter circuit 96—97 of transistor 95 and the setting of potentiometer 113 controls the value of current allowed to flow in base-emitter circuit 99—102 of transistor 100.

It is well known in the art of transistors that the value of current flowing through its base-emitter circuit controls and determines the value of current flowing through its collector-base circuit.

Therefore, it follows that the setting of potentiometer 104 controls the value of charging current allowed to flow to determine the time interval and the motor acceleration. Likewise, the setting of potentiometer 113 controls the value of discharging current allowed to flow to determine the time interval and the motor deceleration.

Therefore, condenser 121 is connected so that once it is charged, it will always be maintained charged with a potential equal to that of the reference voltage. Should the charge decrease on condenser 121 for any reason, charging current will flow during the next half cycle transistor 95 is conductive to bring condenser 121 back up to charge.

It is to be noted that the timing circuit is symmetrical and that its operation during deceleration is substantially the same as its operation during acceleration with the role of the condenser and reference voltage being interchanged.

The magnitude or size of condenser 121 is basic in determining the overall time interval which is provided by this timing circuit. The timing relationship is a linear one and can be illustrated by a straight line curve showing the extremes of timing adjustment available for any given condenser size. Increasing the size of condenser 121 will increase the duration of the time interval since the condenser is charged at a constant current rate causing the voltage to increase in direct proportion. That is, the voltage on condenser 121 will build up in proportion to the current flowing to the condenser; consequently, the use of a larger condenser will require a longer time interval to become charged to the desired voltage value. While the above description relates to the charging of a condenser, the same is true as to discharging a condenser.

Since the circuit is a symmetrical one, it is possible to interchange the input and output without affecting its operation which provides one additional degree of flexibility that is very useful. This is to operate the timing unit as a reversing device in which both positive and negative input signals are applied. In this use, the voltage on condenser 121 can be built up to a positive value and then discharged in a linear manner through zero and charged with a voltage of a negative value.

Also, it is to be noted that control for both acceleration and deceleration is provided without the use of any electrical contacts or auxiliary switching devices.

The timing circuit has a substantially high impedance and the power available at its output terminals is very low. This requires that an auxiliary amplifier be used to provide a signal of the proper value to drive control winding 59.

The signal amplifier is a solid state amplifier designed to have a high input impedance with substantial current gain and a voltage gain of approximately .95.

The amplifier is generally shown at 126 and is connected so when condenser 121 begins to take on a charge, a small current flows through wire 122, a resistor 127, a base-emitter circuit 128—131 of a transistor 129, a wire 137, a wire 158, control winding 59, a wire 159, a resistor 160, wire 82, wire 124 and back through wire 123 to condenser 121. This small current flow increases as the charge upon condenser 121 increases; but even when condenser 121 is fully charged, the value of this current is very small.

The flow of current through the base-emitter circuit 128—131 of transistor 129 causes and controls the current conducted through its collector-emitter circuit 130—131. The current flow is from wire 81, through a resistor 146, a wire 141, an emitter-base circuit 135-133 of a transistor 134, a wire 132, collector-emitter circuit 130—131 of transistor 129, wire 137, wire 158, control winding 59, wire 159 and resistor 160 to wire 82. While the value of this current is small, it is larger than the afore-described current.

The current flowing through the emitter-base circuit 135—133 of transistor 134 causes its emitter-collector circuit 135—136 to be conductive. Current now flows from wire 81, through resistor 146, wire 141, emitter-collector circuit 135—136, wire 158, control winding 59, wire 159 and resistor 160 to wire 82. The value of the current flowing through this path is very large by comparison to the value of the current flowing through the aforedescribed circuits containing the base-emitter 128—131 and collector-emitter 130—131 of transistor 129.

As the charge on condenser 121 increases, the values of currents flowing through the aforedescribed paths increase. For deceleration, the values of currents flowing through the aforedescribed paths will decrease as the charge on condenser 121 decreases.

When regulating transformer 63 is first energized, amplifier 126 is connected to be energized thereby and current flows from wire 81, resistor 146, wire 141, an emitter-collector circuit 142—145 of a transistor 143, a wire 147 and a resistor 148 to wire 82. At this time, the entire amplifier output flows through the described path and the value of the current is preset by the potential on the base 144 of transistor 143. The current in emitter-base circuit 142—144 of transistor 143 flows from wire 81, through resistor 146, wire 141, emitter-base circuit 142—144, a wire 152, a slider 153A on a potentiometer 153, a wire 154, a resistor 156, a wire 157, and wire 124 to wire 82.

The potential at base 144 is controlled by current flowing from wire 81 through a wire 149, a resistor 150, a wire 151, potentiometer 153, wire 154, resistor 156, wire 157 and wire 124 to wire 82. The current flowing through the aforedescribed emitter-base circuit 142—144 is controlled by the setting of slider 153A upon potentiometer 153.

As the charge upon condenser 121 increases, the current flow through the aforedescribed paths connected to control winding 59 increases proportionally and the current flow through the emitter-collector circuit 142—145 of transistor 143 decreases proportionally. Therefore, amplifier 126 can be described as a constant current amplifier having a current output that is divided by means of transistors 143 and 134 to assure that the proper value of output current flows through control winding 59.

It is to be noted, that as the potential on wire 122 increases, the voltage drop across resistor 160 also increases. This fact together with wire 137 connecting collector 136 of transistor 134 to emitter 131 of transistor 129 provides a negative feedback connection and enables the circuit to have a very stable operation with respect to any temperature changes, variation of transistor parameters, or line voltage changes.

A voltage divider consisting of resistors 161 and 163, which are connected together by a wire 162, is connected across wires 81 and 82. Wire 162 is connected to wire 132 to determine the voltage operating level for transistor 134.

Control winding 60 is connected by a wire 164, a wire 166 and a resistor 167 to the output of tachometer generator 165. Tachometer generator 165 is driven at the same speed as D.C. motor 16 by the connection of its shaft 168 to drive shaft 26. Therefore, the voltage output of tachometer generator 165 is in direct proportion to the speed of D.C. motor 16. The flow of current through control winding 60 is in a direction to produce flux in reactor cores 43A and 47A opposite that produced in the respective cores by the current flowing in reactor windings 43 and 47.

In the aforementioned co-pending application bearing Serial Number 803,189, filed on May 31, 1959, it is described how the polarity switching circuit controls the conduction time of tubes 27 and 28 which briefly is as follows.

During the half cycle wire 30 is positive, so tube 27 can be made conductive, wire 41 is also positive. Therefore, in this half cycle current will attempt to flow through rectifier 42 and reactor winding 43. However, because reactor core 43A is not saturated at the start of this half cycle, due to the flux produced therein by the control windings 58, 59 and 60, reactor winding 43 presents an extremely high impedance to the flow of current. This causes substantially all of the voltage from secondary winding 40 to appear across reactor winding 43; therefore, at the start of the half cycle, wire 44 is at substantially the same polarity as wire 45.

As this small value of current flows through reactor winding 43, it produces a flux in reactor core 43A causing reactor core 43A to become saturated at some instant during the half cycle.

When saturation occurs, the impedance of reactor winding 43 is reduced to a very small value switching the polarity at wire 44 to substantially the same as at wire 41. Most of the voltage now appears across resistors 53 and 55. Therefore, the polarity on wire 44 which is connected to control grid 27B is switched from a negative to a positive polarity and tube 27 is made conductive.

It is well known that tubes of this type continue to conduct current until the end of the half cycle, once conduction is initiated. Therefore, the time in the half cycle that reactor core 43A saturates controls the amount of current supplied to the load.

As described, reactor core 43A is caused to become saturated by current flowing through reactor winding 43. The time required for this to occur depends upon the level of flux in reactor core 43A at the start of this half cycle. This level of flux depends solely upon the value of the currents energizing control windings 58, 59 and 60.

It is obvious that the same action occurs in the other half cycle with respect to reactor winding 47 and reactor core 47A to control the conduction of tube 28. Therefore, for the sake of brevity, the description of operation for this half cycle will no be made.

In the half cycle tube 28 is conductive, no current can flow through reactor winding 43 because of rectifier 42. Therefore, the only flux produced in reactor core 43A will be produced by control winding 58, 59 and 60 to determin the flux level in reactor core 43A at the start of the next half cycle.

With switch 92 open, there is no reference voltage and condenser 121 will not have a charge on it. Thus, no current will flow through control winding 59 and the entire output current of amplifier 126 will flow through the circuit having the emitter-collector 142—145 of transistor 143 therein.

Control winding 58 is continuously energized. As described, it produces a flux opposite to that produced by current flowing through reactor windings 43 and 47. With only control winding 58 energized, reactor cores 43A and 47A are prevented from becoming saturated during respective half cycles and tubes 27 and 28 will not conduct any current. Thus, field winding 21 is not energized and D.C. generator 14 will have no output.

To start D.C. motor 16, slider 89 is set at the desired speed setting and switch 92 closed.

A voltage now appears on slider 89 and current is conducted through the aforedescribed charging current path during the conducting half cycle of transistor 95 to charge condenser 121.

As condenser 121 takes on a charge, current flows through the base emitter circuit 128–131 of transistor 129 causing it to become conductive. As the charge on condenser 121 increases, this current flow is increased to increase the conductivity of transistor 129.

The increasing conductivity of transistor 129 increases the current flowing through the emitter-base circuit 135—133 of transistor 134 so it becomes conductive and likewise starts and conducts a current increasing through its emitter-collector circuit 135—136 and control winding 59.

Control winding 59 is now energized and produces a flux in reactor cores 43A and 47A to assist that produced by current flowing in reactor windings 43 and 47. The flux level in reactor cores 43A and 47A is thereby raised so they become saturated during their respective half cycles and tubes 27 and 28 are caused to conduct current to field winding 21. This gives D.C. generator 14 an output and D.C. motor 16 starts to operate.

As the current flow through control winding 59 increases, reactor cores 43A and 47A saturate earlier in their respective half cycles to increase the output of tubes 27 and 28 and the energization of field winding 21. The output of D.C. generator 14 is proportionally increased and D.C. motor 16 is accelerated at a linear time rate up to the desired speed.

When condenser 121 have become charged equal to the voltage on slider 89, no further increases of current occur and the acceleration of D.C. motor 16 is stopped since it is operating at the desired speed.

Thus, it is seen that D.C. motor 16 is accelerated up to the desired speed at the same linear time rate that condenser 121 becomes charged.

To change the time rate of acceleration, it is necessary to change the time required for condenser 121 to become charged. This is accomplished by controlling the conductivity of transistor 95 to change the value of charging current flowing through transistor 95. The value of charging current is varied by altering the setting of potentiometer 104 in the base-emitter circuit 96—97. Thus, a new average constant charging current value is established for the current flowing through transistor 95.

By increasing the resistance of potentiometer 104, less current will flow through base-emitter circuit 96—97 to decrease conductivity of transistor 95 and the charging current flowing through its collector-base circuit 94—96. Thus, the time required for condenser 121 to become fully charged is increased and the time rate of acceleration is decreased.

To increase the time rate of acceleration, the setting of potentiometer 104 is varied to decrease its resistance which increases the conductivity of transistor 95 by increasing the value of charging current allowed to flow through its collector-base circuit 94—96. Thereby, the time required for condenser 121 to become charged is decreased and increases the time rate of D.C. motor 16 acceleration and it comes up to the desired speed faster.

To decelerate D.C. motor 16, slider 89 of potentiometer 88 is moved to a selected lower voltage.

The voltage now appearing across condenser 121 is greater than that appearing on slider 89 and current will flow thereto through the aforedescribed discharge path containing the collector-base circuit 101—99 of transistor 100.

The signal amplifier reacts to the decreasing voltage on condenser 121 in the reverse manner as that which is described for the increasing voltage. That is, as the charge on condenser 121 is decreased, the current flowing through the base-emitter circuit 128—131 of transistor 129 is proportionally decreased. This decreases the conductivity of transistor 129 and the current allowed to flow through its collector-emitter circuit 130—131. Since this current also flows through the emitter-base circuit 135—133 of transistor 134, the conductivity of transistor 134 is decreased. The current flowing through the emitter-collector circuit 135—136 of transistor 134 is decreased and the current flowing through the emitter-collector circuit 142—145 of transistor 143 is increased.

Since control winding 59 is connected to the emitter-collector circuit 135—136 of transistor 134, it is energized with a decreasing current. This lowers the flux level in reactor cores 43A and 47A so tubes 27 and 28 fire later in their respective half cycles, decreasing energization of field winding 21 and D.C. motor 16 decelerates to the newly selected lower speed.

The value of discharging current controls the time required for condenser 121 to discharge to a voltage equal to that on slider 89 which determines the time rate of deceleration. Since the value of the discharging current depends on the conductivity of transistor 100, it may be varied by changing the current flowing through the base-emitter circuit 99—102 of transistor 100. This is done by altering the setting of potentiometer 113.

Increasing the resistance of potentiometer 113 decreases the conductivity of transistor 100 and the value of the discharging current. Thereby, the time required for condenser 121 to discharge is increased and the time rate of deceleration of D.C. motor 16 is decreased.

Conversely, decreasing the resistance of potentiometer 113 increases the conductivity of transistor 100 and the value of the discharging current. This allows condenser 121 to discharge in a shorter time and thereby increase the time rate of deceleration of D.C. motor 16.

While I have described my invention in a particular application, it is apparent that the timing and amplifier circuits may be used singly or jointly in many other applications.

I claim:

1. In an electrical system for controlling the acceleration of a motor comprising a power converter for controlling said motor; control circuit means for controlling said converter; a timing circuit connected to said control circuit means through an amplifier; a reference voltage indicative of the desired motor speed, said timing circuit comprising a condenser to be charged by a current from the reference voltage of a value determined by a transistor and upon application of said reference voltage, the condenser takes on a charge and increasingly energizes said control circuit means through the amplifier whereby the motor accelerates until said condenser is charged to a potential equal to the reference voltage.

2. In an electrical system as described in claim 1 wherein additional control means is provided to control the transistor and change the value of the charging current to change the acceleration of the motor.

3. In an electrical system for controlling the deceleration of a motor comprising a power converter for controlling said motor; control circuit means for controlling said converter; a timing circuit connected to said control circuit means through an amplifier; a reference voltage indicative of the desired motor speed; said timing circuit comprising a condenser to be discharged by a current to the reference voltage of a value determined by a transistor and upon a decrease in said reference voltage, said condenser discharges through the transistor to the reference voltage and decreasingly energizes said control circuit means through the amplifier whereby the motor decelerates until said condenser is discharged to a potential equal to the reference voltage.

4. In an electrical system as described in claim 3 wherein additional control means is provided to control the transistor and change the value of the discharge current to change the deceleration of the motor.

5. In an electrical system for controlling the acceleration and the deceleration of a motor comprising a power converter for controlling said motor; control circuit means for controlling said converter; a timing circuit connected to said control circuit means through an amplifier; a reference voltage indicative of the desired motor speed; said timing circuit comprising a condenser to be charged through a first transistor from the reference voltage and discharged through a second transistor to the reference voltage by current of a value determined independently by each transistor; and upon an increase of the reference voltage said condenser charges from the reference voltage and increasingly energizes said control circuit means through the amplifier causing the motor to accelerate, and upon a decrease of the reference voltage said condenser discharges to the reference voltage and decreasingly energizes said control circuit means through the amplifier causing the motor to decelerate and said acceleration or deceleration continues until said condenser has a charge equal to the reference voltage.

6. In an electrical system as described in claim 5 wherein additional control means is provided to separately and independently control the first and second transistor and change the current flowing therethrough to independently change the acceleration and deceleration of said motor.

7. A timing circuit having an input circuit connected to a source of reference voltage; a condenser to be charged by a current from the reference voltage through a transistor; a source of alternating current connected to said transistor to render it conductive only during one half cycle of the alternating current and thereby control the value of the current charging the condenser.

8. A timing circuit having an input circuit connected to a source of reference voltage; a transistor having an emitter, collector, and base; a condenser connected to be charged by current from the reference voltage through the collector-base circuit of said transistor when it is rendered conductive; a source of alternating current connected to the base-emitter circuit of said transistor to render it conductive only during one half cycle of the alternating current and thereby control the value of the current charging said condenser.

9. A timing circuit as described in claim 8 wherein adjustable means is connected in the base-emitter circuit of said transistor to control its conductivity and thereby vary the value of the current charging said condenser.

10. A timing circuit having a condenser to be discharged, means for charging said condenser; said condenser connected to be discharged by current flowing to a reference voltage through a transistor; a source of alternating current connected to said transistor to render it conductive only during one half cycle of the alternating current and thereby control the value of the current discharging said condenser.

11. A timing circuit having a condenser to be discharged, means for charging said condenser; a transistor having an emitter, collector, and base; said condenser connected to be discharged by current flowing to a reference voltage through the collector-base circuit of said transistor when it is rendered conductive; a source of alternating current connected to the base-emitter circuit of said transistor to render it conductive only during one half cycle of the alternating current and thereby control the value of the current discharging said condenser.

12. A timing circuit as described in claim 11 wherein adjustable means is connected in the base-emitter circuit of said transistor to control its conductivity and thereby vary the value of the current discharging said condenser.

13. A timing circuit comprising; a condenser to be charged by current flowing from and discharged by current flowing to a reference voltage; a first transistor for controlling the value of the current charging said condenser; a second transistor for controlling the value of current discharging said condenser; a source of alternating current connected to said first and second transistors to render them conductive only during one half cycle of the alternating current and thereby control the value of the current charging or discharging said condenser.

14. A timing circuit comprising; a condenser to be charged by current flowing from and discharged by current flowing to a reference voltage; a first and second transistor each having a collector, emitter and base; said condenser connected to be charged by current flowing from the reference voltage through the collector-base circuit of said first transistor when rendered conductive and to be discharged by current flowing to the reference voltage through the collector-base circuit of said second transistor when rendered conductive; a source of alternating current connected to the base-emitter circuits of both transistors to render them conductive only during one half cycle of the alternating current and thereby independently control the value of the currents charging or discharging said condenser.

15. A timing circuit as described in claim 14 wherein separate adjustable means is connected in the base-emitter circuit of each transistor to respectively control its conductivity and thereby independently vary the value of the current charging said condenser from the value of the current discharging said condenser.

16. A timing circuit comprising; a condenser to be charged from and discharged to a reference voltage; a first and second transistor each having a collector, emitter and base; said condenser connected to be charged by current flowing from the reference voltage through the collector-base circuit of the first transistor and the base-collector circuit of the second transistor when said first transistor is rendered conductive, and discharged by current flowing to the reference voltage through the collector-base circuit of the second transistor and the base-collector circuit of the first transistor when said second transistor is rendered conductive; a source of alternating current connected to the base-emitter circuit of both transistors to render them conductive only during one half cycle of the alternating current and thereby control the value of the current charging or discharging said condenser.

17. A timing circuit as described in claim 16 wherein separate adjustable means is connected in the base-emitter circuit of each transistor to respectively control its conductivity and thereby independently vary the value of the current charging said condenser from the value of the current discharging said condenser.

No references cited.

Notice of Adverse Decision in Interference

In Interference No. 92,981 involving Patent No. 3,019,379, S. A. Zarleng, Accelerating and decelerating control system, final judgment adverse to the patentee was rendered Oct. 31, 1963, as to claims 1, 2, 3, 4, 5 and 6.
[*Official Gazette February 4, 1964.*]